Sept. 29, 1959 S. CIRAOLO 2,906,307
FRUIT CUTTER MACHINE
Filed Jan. 10, 1957 3 Sheets-Sheet 1
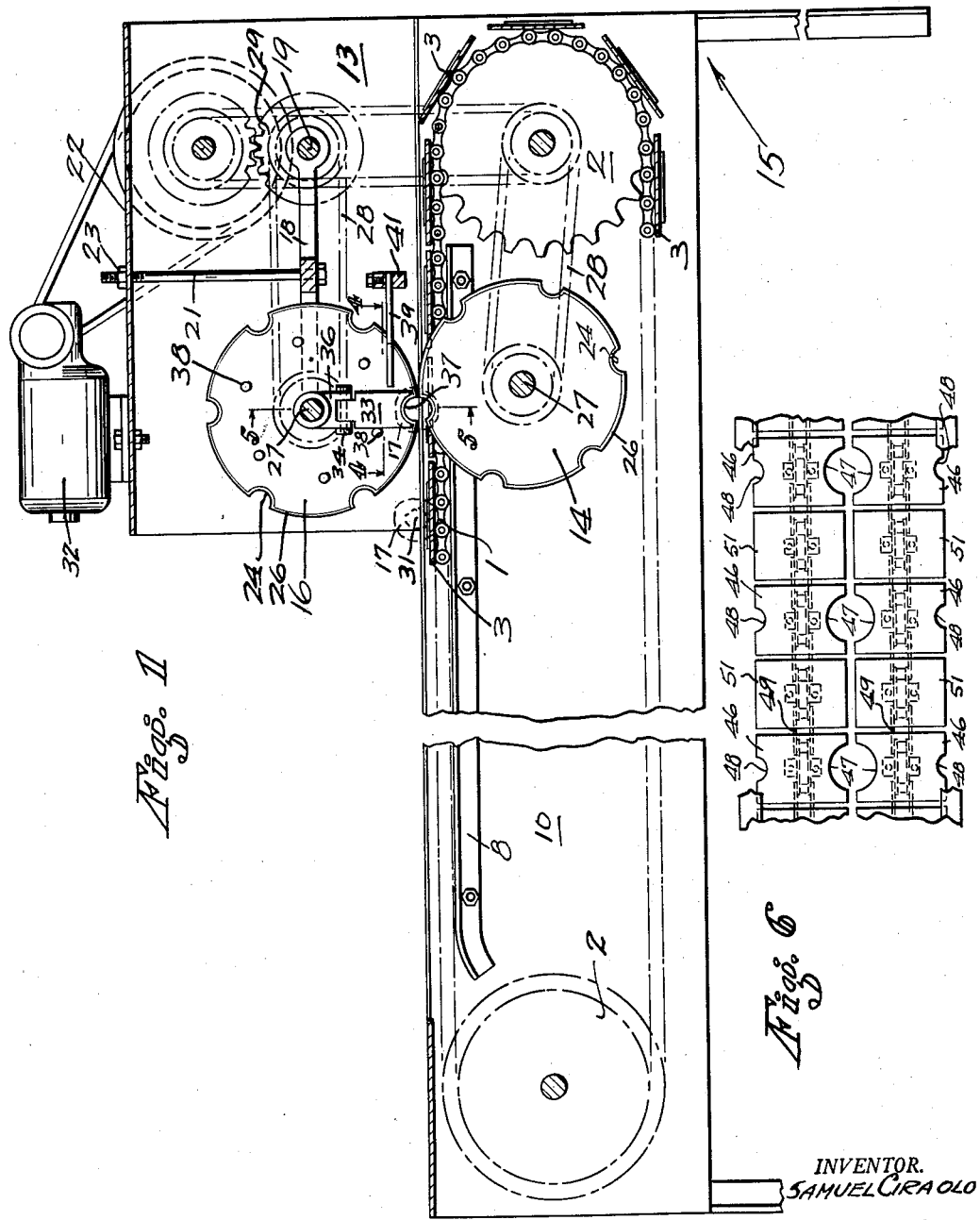
INVENTOR.
SAMUEL CIRAOLO
BY George B White
ATTY.

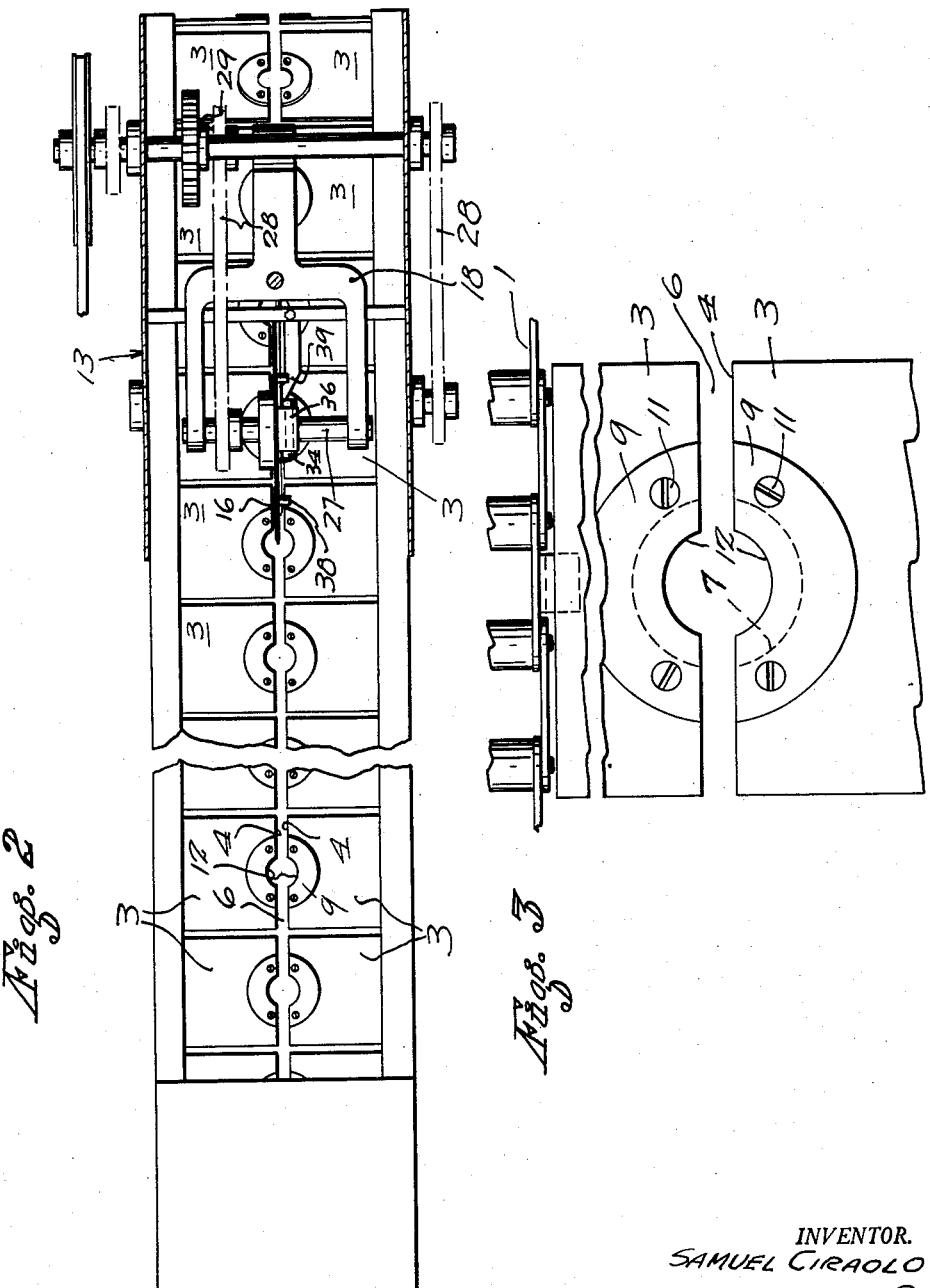

Sept. 29, 1959   S. CIRAOLO   2,906,307
FRUIT CUTTER MACHINE
Filed Jan. 10, 1957   3 Sheets-Sheet 3
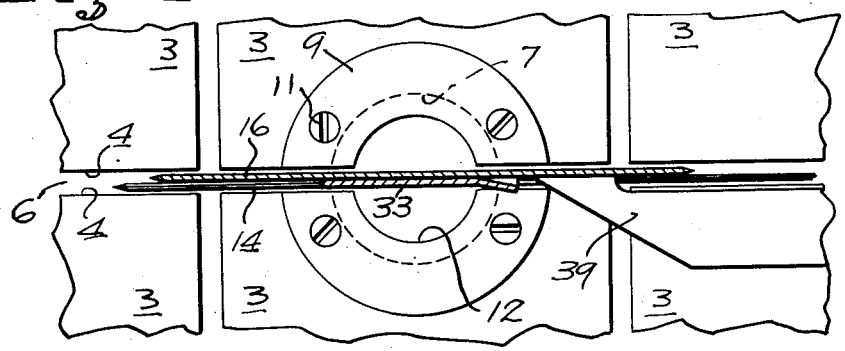
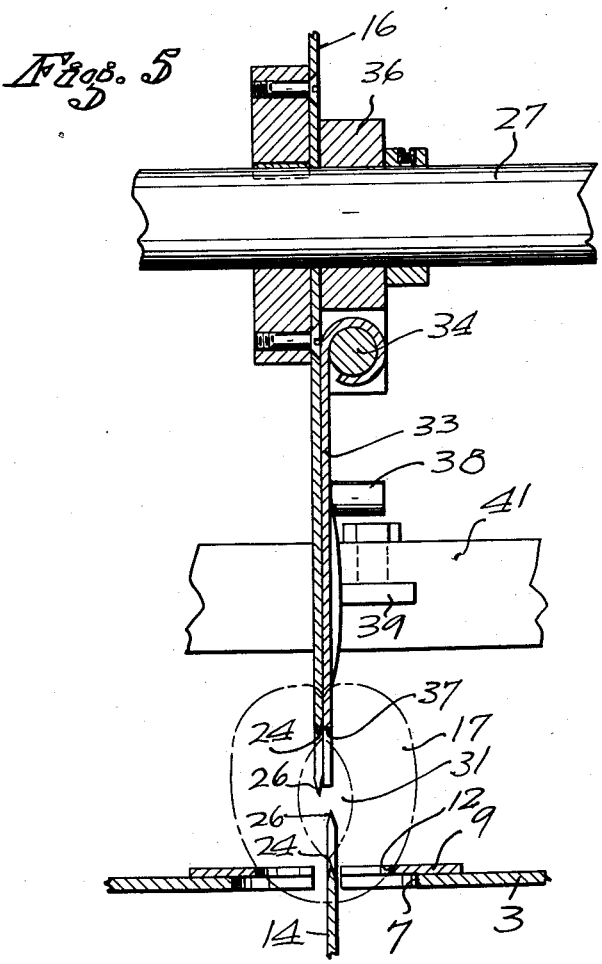
INVENTOR.
SAMUEL CIRAOLO
BY George B White
ATTY.

2,906,307
FRUIT CUTTER MACHINE

Samuel Ciraolo, Modesto, Calif.

Application January 10, 1957, Serial No. 633,402

3 Claims. (Cl. 146—28)

This invention relates to a cutting machine for free-stone fruits such as apricots, free-stone peaches and the like.

The problem encountered in cutting in half free-stone fruits such as apricots and peaches, is the holding of the fruit in proper position, slicing it along the suture line of the fruit, and separating the cut halves so as to allow the releasing of the pit from the cut fruit.

The object of this invention is to provide an apparatus wherein each fruit is supported in an individual socket or hole and is carried in such a position that its suture line is generally vertical, faces in the direction of its travel and is aligned with the cutting edges of rotary blades in the path of its travel; and then providing blades with such peripheral contour as to assist in the slicing of the fruit from opposite directions along the suture line to the outline of the average pit in the fruit and then to cause the separation of the cut fruit so as to facilitate removal of the pit.

Another object of the invention is to provide a suitable conveyor which permits the extension through the middle thereof of a rotating slicer blade to coact with another slicer blade for cutting into the fruit held in vertical position by means on the conveyor which means are capable of passing over or along this cutting blade, said blades being so arranged as to assist in holding the fruit in an upright position while it is advanced with said conveyor.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a cross-sectional view of my fruit cutter apparatus.

Fig. 2 is a top plane view of my fruit cutter apparatus.

Fig. 3 is a fragmental plane view of the fruit carrying conveyor.

Fig. 4 is a fragmental sectional plane view of the conveyor showing the cutting and separating blades, the section being taken on lines 4—4 of Fig. 1.

Fig. 5 is a fragmental cross sectional view of the device along the cutting blades, the section being taken on lines 5—5 of Fig. 1, and Fig. 6 is a fragmental plan view of a modified form of my fruit carrying conveyor.

My fruit cutter includes a conveyor device which has a pair of parallel chain conveyors 1 played around sprockets 2 and moving in synchronism. Each conveyor has thereon a series of plates 3. Each plate 3 covers about one-half of the distance between the spaced conveyors 1, so that the middle or meeting edges 4 of opposite plates 3 are spaced from each other and form a longitudinal slit 6 along the middle of the apparatus. In the middle or meeting edge of each plate 3 is formed a hole or socket 7 by complemental semi-circular recesses in the adjacent edges 4 of the pair of plates. Suitable rails 8 are supported on the sidewalls 10 of the machine below the upper run of the conveyors 1 to prevent the dropping of the plates 3 downwardly.

In order to make the hole or socket 7 adaptable for fruit of various sizes, the hole 7 is made the maximum size, and socket plates 9 can be secured by screws or bolts 11 in the respective plates 3 to hold the adapting socket plates 9 in position. Thus recesses or sockets 12 of desired smaller sizes are provided to conform to the size of the fruit handled.

The sprockets 2 are rotatably supported in suitable bearings on the machine frame 15 and are inclosed in a casing 13.

The conveyor plates 3 carry the fruit to a pair of rotating slicer blades 14 and 16. The lower blade 14 extends through the slit 6 between the pairs of plates 3 sufficiently above the plates 3 to cut into the fruit 17 to about the middle of the fruit. The upper blade 16 is supported on a swivel arm 18 which is fulcrumed on a shaft 19 so that the arm 18 drops by its own weight toward the lower blade 14. A suspending rod 21 extends from the arm 18 upwardly through the top plate 22 of the casing 13 and is limited in downward movement by a nut 23 threaded on the outer end of the rod 21 so as to render the lowered position of the upper disc blade 16 adjustable to fruit of different sizes.

Each of the disc blades 14 and 16 has a plurality, in this illustration six semi-circular recesses 24 in its peripheral cutting edge 26 which recesses 24 are equally spaced from one another. The disc blades are keyed respectively to transverse shafts 27 whereby the disc blades are rotatable and each shaft 27 is driven by a suitable chain drive 28 operating in synchronism with the drive sprockets 2.

The lower disc blade 14 is driven directly from the drive sprocket 2 so as to rotate in a clock-wise direction, viewing Fig. 1. The upper disc blade 16 is driven through a driven transmission gear 29 which is rotated in a contra clockwise direction, viewing Fig. 1. Thus both disc blades are rotated so that their peripheral portions adjacent the conveyors 1 move with the conveyor plates 3 and generally in the same direction toward the outlet end of the machine. The drives are so synchronised and blades 14 and 16 are so mounted that the respective opposite peripheral recesses 24 of the disc blades 14 and 16 reach a position at their fruit substantially in registry with one another.

The upper disc blade 16 is somewhat in advance of the lower disc blade 14 toward the direction from which the fruit 17 approaches the blades so that the recess 24 in the upper disc blade 16 will contact the top of the fruit 17 first and hold the fruit in its position in the socket 12 as it is carried toward the lower disc blade 14. In other words, the upper blade 16 cuts into the fruit 17 first and its recess 24 engages the pit 31 so as to hold the fruit upright while the lower blade 14 cuts into the meat of the fruit 17. When the fruit 17 is firm, then a slight spacing between the cutting edges or peripheries of the blades 14 and 16 will allow the fruit to split in half. When the machine is used for slicing riper fruit, then the upper blade 16 is adjusted so as to slightly overlap or at least to extend to the cutting peripheral edge of the lower blade 14. The rotating movement of the upper blade 16 in the same direction as the conveyors 1 causes the urging of the fruit 17 in the same direction toward the outlet end of the machine.

The machine is driven by a suitable motor 32 and the sliced fruits are ejected when the plates 3 are turned upside down as they turn in the casing 13 at the outlet end of the machine.

In order to make certain that the halves of the fruit are separated, a separator finger 33 is provided. This finger 33 is swingably supported on a pivot pin 34 parallel with the conveyors 1. The pin 34 in turn is rotatably supported on a hanger 36 journalled on the shaft 27 of the upper disc blade 16. In this manner the finger 33 is allowed to swing around the shaft 27 as a fulcrum and also to swing away from the face of the upper disc blade 16. Normally this finger 33 extends vertically and has a recess 37 in its lower edge conforming to the contour of the pit so that it projects into the slit of the fruit 17. A plurality of pushing lugs 38 project from the adjacent face of the upper disc blade 16 and the lug 38 behind the finger 33 engages the finger 33 and pushes it in a contra clockwise direction viewing Fig. 1, and in the direction of the movement of the conveyors 1, as the fruit 17 is advanced by the blades 14 and 16. A wedge 39 extends from a fixed machine element or bracket 41 toward the finger 33 so that as the finger 33 is pushed, it rides over the outer edge of the wedge 39 and is pushed away from the face of the disc blade 16, thereby pushing the adjacent half of the slit fruit 17 away from the other half under the disc blade 16. The body of the wedge 39 is spaced far enough from the face of the disc to allow the pushing lugs 38 to pass under the wedge 39. Thus the pushing lug 38 can pass also under the finger 33 when the finger 33 is held by the body of the wedge 39 away from the face of the disc blade 16, and thus the finger 33 is allowed to swing back to its initial vertical hanging position for engaging the next fruit 17.

In operation the fruit 17 is placed in vertical position into the sockets 7 or 12, as the case may be, so that the suture line of the fruit is vertical and faces toward the direction in which the conveyor plates 3 advance. The conveyor plates 3 are carried by the conveyors 1 so that the fruit 17 is carried to engagement first with the top disc blade 16. The arrangement of the recesses 24 and the synchronized speed of the disc blades 14 and 16 are such that the socket 12 with the fruit 17 therein reaches a position adjacent the cutting periphery of the upper disc blade 16 about the time when one of the recesses 24 approaches cutting position so that it can penetrate into and engage the fruit 17. For this purpose the relative spacing longitudinally between adjacent sockets 7 or 12 and the peripheral spacing between the recesses 24 is proportioned with the relative synchronized speed of the advancement of the conveyors 1 and the peripheral speed of the rotating disc blades 14 and 16. As the fruit 17 is thus positioned in the conveyor socket, it is guided by the upper blade 16 until the next recess 24 of the lower blade 14 also reaches the fruit and cuts into the same as illustrated in Figs. 1 and 5. The recesses 24 of the opposite disc blades 14 and 16 are in the proximity of the ends of the pit 31 in the fruit 17 and aid in carrying the fruit 17 toward the outlet of the machine. The swingable finger 33 and its recess 37 also engage the slit in the fruit 17 and thus as the fruit is advanced, the finger being swung in a contra-clockwise direction viewing Fig. 1, rides on the outer edge of the wedge 39 away from the face of the upper disc blade 16 so as to free itself from the pushing lug 38. This outward movement of the finger 33 pushes one half of the sliced fruit away from the pit and exerts a force for separation from the other half. As the respective pushing lug 38 has passed under the finger 33, the finger 33 swings back again into vertical operating position for the next fruit 17. The fruit 17 so sliced is then carried by the plates 3 until the plates 3 turn in the casing 13 downwardly and then are dumped from the socket by their own gravity.

In the modified form, shown in Fig. 6, each of the carrier plates 46 has a large half socket 47 in one edge and a smaller half socket 48 in the other edge thereof. By reversing and interchanging the chains 49 from the sprockets on one side of the machine to the sprockets on the other side, selectively, either the larger sockets 47 for larger fruits, such as peaches, or the smaller sockets 48 for smaller fruits, such as apricots, can be aligned at the middle. In order to accommodate the larger spacing needed a blank plate 51 is placed between adjacent carrier plates 46 and a correspondingly larger cutter disc is provided so that the peripheral recesses of the cutter discs are spaced again to correspond to the spacing between the respective carrier sockets. In other respects the machine operates as heretofore described.

The device is simple in construction and operation, it does not require continual adjustment and it can be operated with minimum labor and positively.

I claim:

1. In a fruit cutting machine, the combination with a pair of parallel spaced conveyors and a pair of rotating vertical cutting disc blades generally aligned with the space between said conveyors, one of said disc blades being above and the other below the upper conveyor surface of said conveyors; of a series of generally horizontal plates on each conveyor extended toward the other conveyor over the space between the conveyors, each plate having generally parallel edges longitudinal with the respect to said conveyors, the adjacent edges of opposite plates between said conveyors being spaced from one another to form a slit in registry with said vertical disc blades said adjacent edges of longitudinally equally spaced plates in each series having recesses so arranged that the recess in said adjacent edge of one plate complements the recess on the adjacent edge of the other plate to form a fruit carrying socket; each disc blade having a plurality of circumferentially equally spaced generally semicircular recesses in its periphery adapted to cut into the fruit carried in the respective sockets to said disc blades, the upper disc blade being advanced with respect to the lower disc blade toward the direction from which the fruit is carried so that each recess of the upper disc blade engages and holds the fruit in the respective socket in advance of the respective opposite recess of the lower disc blade, and means to drive said conveyors and said disc blades in synchronism so that each passage of each conveyor socket to said disc blades coincides with the meeting of a set of recesses of said disc blades.

2. The fruit cutting machine defined in claim 1 wherein each of said spaced plates has a recess in each of said parallel edges and the recesses in one parallel edge being larger than the recess in the other parallel edge to form sockets of different sizes when projected in the space between said conveyors, and said plates being mounted on the respective conveyors symmetrically with respect to said parallel edges for selective operative alignment of the recesses of the respective parallel edges according to the relative parallel positions of said conveyors.

3. The fruit cutting machine defined in claim 1, and a separator finger universally swingably supported relatively to the upper disc blade and normally depending along a face of said upper disc blade so as to enter the cut in the fruit, circumferentially spaced elements on said upper disc blade radially trailing each blade recess being engageable with said finger to move said finger with the blade, and relatively stationary guide means in the path of movement of said finger with said upper blade for swinging said finger away from said face of said upper blade so as to push one half of said cut fruit away from the other half, said elements being adapted to clear said guide means during their movement with the rotating upper blade.

References Cited in the file of this patent

UNITED STATES PATENTS

| 1,102,011 | Cunha | June 30, 1914 |
| 1,261,704 | Clemson | Apr. 2, 1918 |
| 1,526,635 | Groves | Feb. 17, 1925 |
| 1,574,307 | Risser | Feb. 23, 1926 |
| 2,071,667 | Thompson | Feb. 23, 1937 |
| 2,179,821 | Hunt | Nov. 14, 1939 |
| 2,588,575 | Rollins, Jr. | Mar. 11, 1952 |